(12) United States Patent
Cai et al.

(10) Patent No.: US 8,848,604 B2
(45) Date of Patent: Sep. 30, 2014

(54) APPLICATION-ORIGINATED TEXT MESSAGES DELIVERED OVER A PACKET-SWITCHED NETWORK

(75) Inventors: Yigang Cai, Naperville, IL (US); Gyan Shanker, Naperville, IL (US)

(73) Assignee: Alcatel Lucent, Boulogne Billancourt (FR)

( * ) Notice: Subject to any disclaimer, the term of this patent is extended or adjusted under 35 U.S.C. 154(b) by 292 days.

(21) Appl. No.: 12/987,336

(22) Filed: Jan. 10, 2011

(65) Prior Publication Data

US 2012/0176964 A1    Jul. 12, 2012

(51) Int. Cl.
*H04W 80/04* (2009.01)
*H04L 29/06* (2006.01)
*H04L 29/08* (2006.01)
*H04L 12/58* (2006.01)
*H04W 4/14* (2009.01)

(52) U.S. Cl.
CPC ............. *H04L 65/1006* (2013.01); *H04W 4/14* (2013.01); *H04L 67/146* (2013.01); *H04L 51/38* (2013.01)
USPC ........... 370/328; 370/352; 370/353; 370/354; 455/456

(58) Field of Classification Search
CPC ....... H04L 12/66; H04L 12/46; H04L 65/102; H04W 80/04
USPC ......... 370/352, 353, 354, 401, 466, 467, 355, 370/356, 338; 455/466; 709/206
See application file for complete search history.

(56) References Cited

U.S. PATENT DOCUMENTS

| | | | |
|---|---|---|---|
| 6,961,330 B1 * | 11/2005 | Cattan et al. .................. | 370/352 |
| 2005/0186979 A1 * | 8/2005 | McCann et al. ............... | 455/466 |
| 2006/0111130 A1 * | 5/2006 | Lee et al. ...................... | 455/466 |
| 2007/0298817 A1 | 12/2007 | Alfano | |
| 2009/0268715 A1 * | 10/2009 | Jansson ......................... | 370/352 |

OTHER PUBLICATIONS

"3rd Generation Partnership Project; Technical Specification Group Services and System Aspects; Support of Short Message Service (SMS) over generic 3GPP Internet Protocol (IP) access; Stage 2 (Release 10)", 3GPP Standard; 3GPP TS 23.204, 3rd Generation Partnership Project (3GPP), Mobile Competence Centre; 650, Route Des Lucioles; F-06921 Sophia-Antipolis Cedex; France, No. V10.2. 0, Sep. 29, 2010, pp. 1-53, XP050442318 [retrieved on Sep. 29, 2010].

(Continued)

*Primary Examiner* — Ian N Moore
*Assistant Examiner* — Hien Nguyen
(74) *Attorney, Agent, or Firm* — Duft Bornsen & Fettig, LLP

(57) ABSTRACT

Systems and methods are disclosed for correlating messages used to deliver an Application Originated (AO) text message to User Equipment (UE). A text message gateway is implemented between a text message application and a packet-switched network that uses Session Initiation Protocol (SIP). The text message gateway receives a delivery request from the text message application that includes an Application Originated (AO) text message intended for the UE. The text message gateway identifies a correlation identifier (ID) for the AO text message, inserts the correlation ID in a delivery response, and transmits the delivery response to the text message application (to store for later use). The text message gateway also converts the delivery request into a SIP request that encapsulates the AO text message, inserts the correlation ID in the SIP request, and transmits the SIP request to the UE.

17 Claims, 6 Drawing Sheets

(56) References Cited

OTHER PUBLICATIONS

"3rd Generation Partnership Project; Technical Specification Group Core Network and Terminals; Technical realization of the Short Message Service (SMS) (Release 9)", 3GPP Standard; 3GPP TS 23,040, 3rd Generation Partnership Project (3GPP), Mobile Competence Centre; 650, Route Des Lucioles; F-06921 Sophia-Antipolis Cedex; France, No. V 9.3.0, Sep. 27, 2010, pp. 1-202, XP050442204 [retrieved on Sep. 27, 2010].

3rd Generation Partnership Project; Technical Specification Group Core Network and Terminals; Support of SMS over IP networks; Stage 3 (Release 9), 3GPP Standard; 3GPP TS 24.341, 3rd Generation Partnership Project (3GPP), Mobile Competence Centre; 650, Route Des Lucioles; F-06921 Sophia-Antipolis Cedex; France, No. V 9.2.0, Dec. 19, 2010, pp. 1-30, XP050462304 [retrieved on Dec. 19, 2010].

3rd Generation Partnership Project; Technical Specification Group Terminals; Multimedia Messaging Service (MMS) Functional description; Stage 2 (3G TS 23.140 version2.0.0), 3GPP Standard; 3G TS 23.140, 3rd Generation Partnership Project (3GPP), Mobile Competence Centre; 650, Route Des Lucioles; F-06921 Sophia-Antipolis Cedex; France, No. V 2.0.0, Mar. 17, 2010, pp. 1-34, XP050401943, [retrieved on Mar. 17, 2010].

* cited by examiner

APPLICATION-ORIGINATED TEXT MESSAGES DELIVERED OVER A PACKET-SWITCHED NETWORK

FIELD OF THE INVENTION

The invention is related to the field of communications and, in particular, to correlating signaling messages that are used to deliver application-originated (AO) text messages.

BACKGROUND

Text messaging has become a popular mode of communication in many mobile (or wireless) networks. One example of text messaging is Short Message Service (SMS), which is a set of communication protocols allowing the exchange of short text messages (i.e., 160 characters or less) between devices. While the term "text message" traditionally referred to text-only messages sent using SMS, it has been extended to include multimedia messages, such as images, video, sound content, etc. The multimedia messages may be sent using Multimedia Message Service (MMS) protocol. Often times, mobile users more frequently use text messaging for communication than voice calls.

Although text messaging is traditionally thought of as two end users exchanging text messages through mobile devices, there may be automated applications (i.e., not a real person) that exchange text messages with an end user. As an example, an External Short Messaging Entity (ESME) is a device/server that includes an application which is able to send and/or receive text messages (e.g., SMS). An ESME connects to the network through a fixed connection using protocols such as Short Message Peer-to-Peer (SMPP) protocol, Universal Computer Protocol (UCP), RESTful, HTTP, Parlay, etc. Typical examples of ESMEs are servers that send automated marketing messages to mobile devices, voting systems that process votes via text message, etc.

To send a text message, an application encapsulates the text message in a signaling message of its protocol. The protocol may be proprietary or may be one commonly used in the industry, such as SMPP. A text message that is originated by an application in this manner is referred to herein as an Application-Originated (AO) text message. When the AO text message is being sent to a Session Initiation Protocol (SIP)-based network, such as an IP Multimedia Subsystem (IMS) or Long Term Evolution (LTE) network, the AO text message is passed through a gateway. This is assuming that the application does not have a SIP interface. The gateway converts the text message from the signaling protocol used by the application to a SIP request (e.g., SIP MESSAGE), and forwards the SIP request towards the destination (referred to as a recipient) over the SIP-based network.

The technical specifications of the $3^{rd}$ Generation Partnership Project (3GPP and 3GPP2) have defined how text messages are exchanged over packet-switched networks using SIP, such as 3GPP Technical Specification (TS) 24.341. As part of these specifications, when a text message is delivered to a recipient, the recipient's device initiates a new SIP transaction to report back on the delivery success/failure of the text message. Thus, the recipient's device sends a new SIP request back to the gateway indicating the delivery success/failure of the text message.

Unfortunately, it is a problem to effectively correlate the multiple SIP transactions for an AO MT text message.

SUMMARY

Embodiments described herein allow for correlation of multiple SIP transactions using a correlation ID. When a gateway receives a text message initiated by an application, the gateway identifies a correlation ID, and sends the correlation ID to the application. The gateway also embeds the correlation ID in the SIP request used to transport the text message to the recipient. The recipient's device (User Equipment) receives the SIP request, and initiates a new SIP request (new SIP transaction) to report the delivery success/failure for the text message. The recipient's device embeds the correlation ID in the new SIP request along with an indication of the delivery success/failure for the text message. When the gateway receives the new SIP request, the gateway locates the correlation ID, and associates the new SIP request with the prior SIP request and the original delivery request based on the correlation ID. By correlating the new SIP request with the original delivery request from the application, the gateway is able to send a delivery response to the application that includes the correlation ID and a delivery report for the text message. The application will be able to correlate the initial delivery request for the text message with the delivery response having the delivery report of the text message based on the correlation ID. Thus, the correlation ID advantageously allows the gateway to correlate multiple SIP transactions. The correlation ID also allows the application to correlate a delivery request with a delivery response so that the application is aware of the delivery status of a text message.

One embodiment comprises a text message gateway that interworks communications between a text message application and a packet-switched network that uses SIP. When in operation, the text message gateway receives a first delivery request from the text message application that includes an Application Originated (AO) text message intended for User Equipment (UE) being served by the packet-switched network. The text message gateway identifies a correlation identifier (ID) for the AO text message, inserts the correlation ID in a delivery response, and transmits the delivery response to the text message application. The text message application may then store the correlation ID for later use. The text message gateway also converts the first delivery request into a first SIP request (e.g., SIP MESSAGE) that encapsulates the AO text message, inserts the correlation ID in the first SIP request, and transmits the first SIP request to the UE.

In another embodiment, the text message gateway receives a second SIP request (e.g., another SIP MESSAGE) from the UE that includes a delivery report for the AO text message, parses the second SIP request to identify the correlation ID, and correlates the second SIP request with the first SIP request and the first delivery request based on the correlation ID. The text message system may then insert the delivery report for the AO text message into a second delivery request, insert the correlation ID in the second delivery request, and transmit the second delivery request to the text message application. The text message application is able to correlate the delivery report with the first delivery request originally used to send the AO text message to the UE. Thus, the gateway is able to provide a delivery status of the AO text message to the text message application in an effective manner so that the application is able to determine whether or not the text message was successfully received by its recipient.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
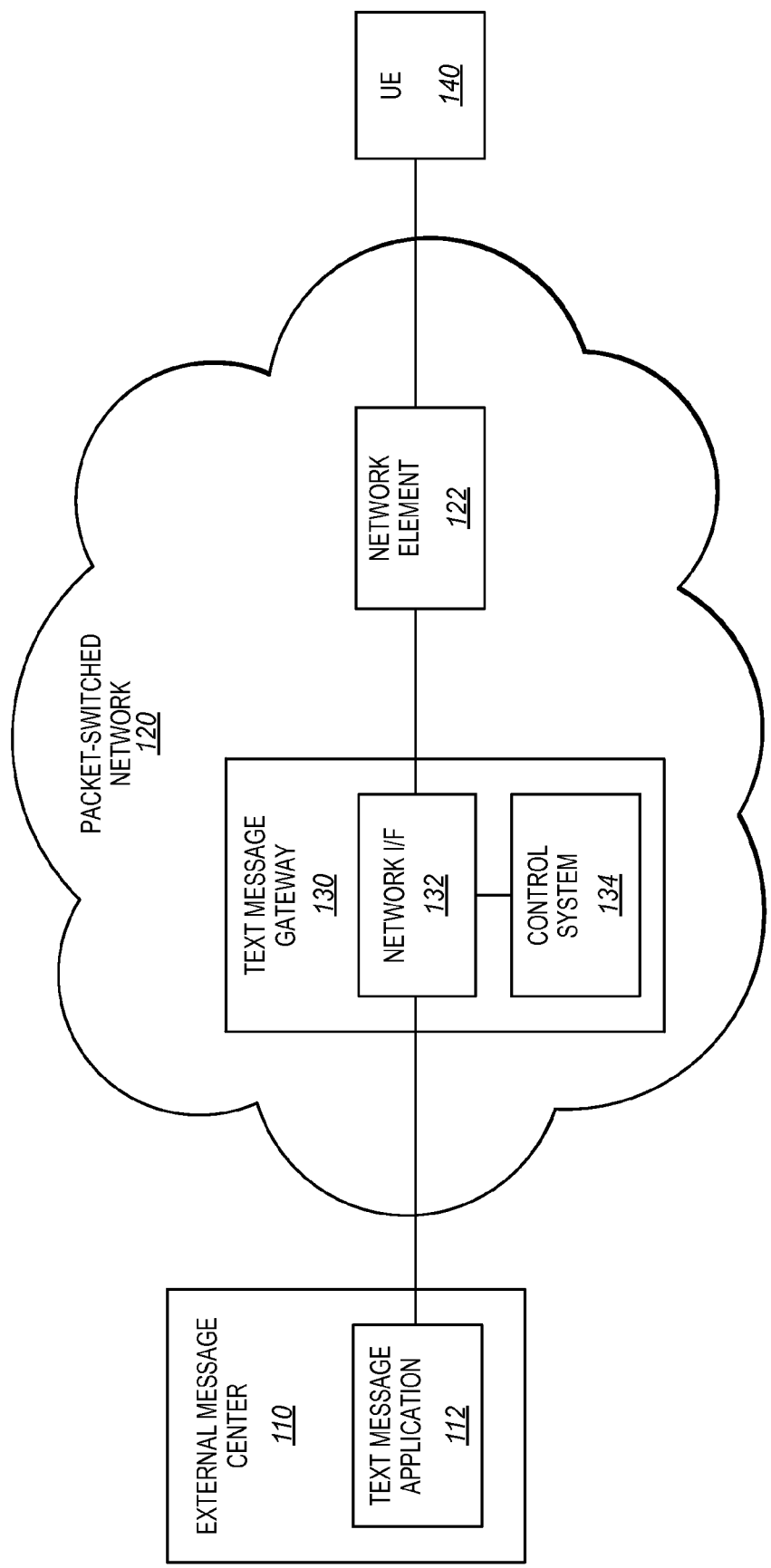
FIG. 1 illustrates a communication system in an exemplary embodiment.

FIG. 1 illustrates a communication system 100 in an exemplary embodiment. Communication system 100 includes one or more external message centers 110 coupled to a packet-switched network 120. System 100 is able to transport text messages from external message center 110 to User Equipment (UE) 140 that is served by packet-switched network 120. Text messages sent from external message center 110 to UE 140 over packet-switched network 120 are referred to as Mobile Terminated (MT) text messages.

External message center 110 comprises any system, server, or device that is able to generate a text message, and send the text message to packet-switched network 120 for delivery to UE 140. One example of external message center 110 is an ESME. Typical examples of ESMEs are systems that send automated marketing messages to mobile users, voting systems that process text message votes, etc. In this embodiment, external message center 110 includes a text message application 112 that generates text messages, and initiates transmission of the text messages to packet-switched network 120.

Packet-switched network 120 comprises any network that exchanges communications using packets, such as IP packets. Packet-switched network 120 may comprise an IMS network, an LTE network, or any other IP-based network. Packet-switched network 120 may include a variety of elements in order to provide voice and/or data services to UE 140, such as network element 122. Some examples of network element 122 include a Serving-Call Session Control Function (S-CSCF), a PDN Gateway (P-GW), etc.

Communication system 100 also includes a text message gateway 130. Text message gateway 130 comprises any system, server, or device that interworks communications between external message center 110 and UE 140 and/or network element 122 in packet-switched network 120. Application 112 in external message center 110 may not support protocols that are used for message delivery in packet-switched network 120, such as SIP. Thus, text message gateway 130 allows application 112 and various other applications to send text messages in different protocols (e.g., APIs) toward packet-switched network 120, such as Parlay, RESTful, LDAP, XML, and SMPP. For example, if application 112 sends a text message intended for UE 140, application 112 may use a RESTful API to send the text message. Text message gateway 130 is able to normalize the RESTful protocol message, and convert it into a SIP request. Text message gateway 130 may then send the SIP request to UE 140 over packet-switched network 120 to deliver the original text message. Some examples of text message gateway 130 include an IP-SM-GW in an IMS network, or an LTE SMS gateway in an LTE network.

Text message gateway 130 may be part of a packet-switched network 120 (as shown in FIG. 1), or may be coupled to packet-switched network 120 in order to interwork messages sent to packet-switched network 120. Also, communication system 100 may have multiple text message gateways 130 to handle the higher traffic loads, for geo-redundancy, etc. Thus, text message gateway 130 as illustrated in FIG. 1 may represent a single gateway or a cluster of gateways (e.g., gateway A, gateway B, gateway C, etc).

Text message gateway 130 includes a network interface 132 and a control system 134. Network interface 132 comprises any device or component that communicates with external message center 110 and other message centers through a variety of protocols. Network interface 132 is also able to communicate with one or more elements 122 of packet-switched network 120 through a protocol used within packet-switched network 120, such as SIP. Control system 134 comprises any device or component that correlates messages between external message center 110 and UE 140.

In the following embodiments, when application 112 originates a text message intended for UE 140, application 112 sends the text message to gateway 130 for interworking. This text message is referred to as Application Originated (AO) text message. Gateway 130 then sends the text message to UE 140 in a SIP request. As a background, there are a set of commands defined within SIP that are referred to as SIP requests or "methods". One such SIP request is a SIP MESSAGE that is used to transport instant messages (IM), text messages, etc. SIP also defines a set of commands referred to as SIP responses. The SIP responses are used to respond to a particular SIP request. Some common SIP responses are 1xx, 2xx, 3xx, 4xx, 5xx, and 6xx.

Presently, when a SIP request (that encapsulates a text message) is sent to a device, the receiving device does not provide a delivery report (text messaging acknowledgement or error) of the text message in a SIP response. The receiving device provides a SIP response (acknowledgement) that the SIP request itself was received, such as in a SIP 200 OK. But this SIP response does not indicate whether the text message within the SIP request was successfully delivered to its recipient(s); it only indicates the delivery status of the SIP request. There may be a variety of reasons why the SIP request was successfully received but there were errors with the text message inside of the SIP request, which are beyond the scope of this discussion. Per 3GPP specifications, the receiving device initiates a new SIP transaction to provide a delivery report of the text message by sending a separate SIP request that reports the delivery status.

The embodiments described herein allow for correlation of the multiple SIP transactions in gateway 130 when handling an AO text message. The correlation is possible using a correlation ID, which is further described in FIGS. 2-4.

Figure 2:
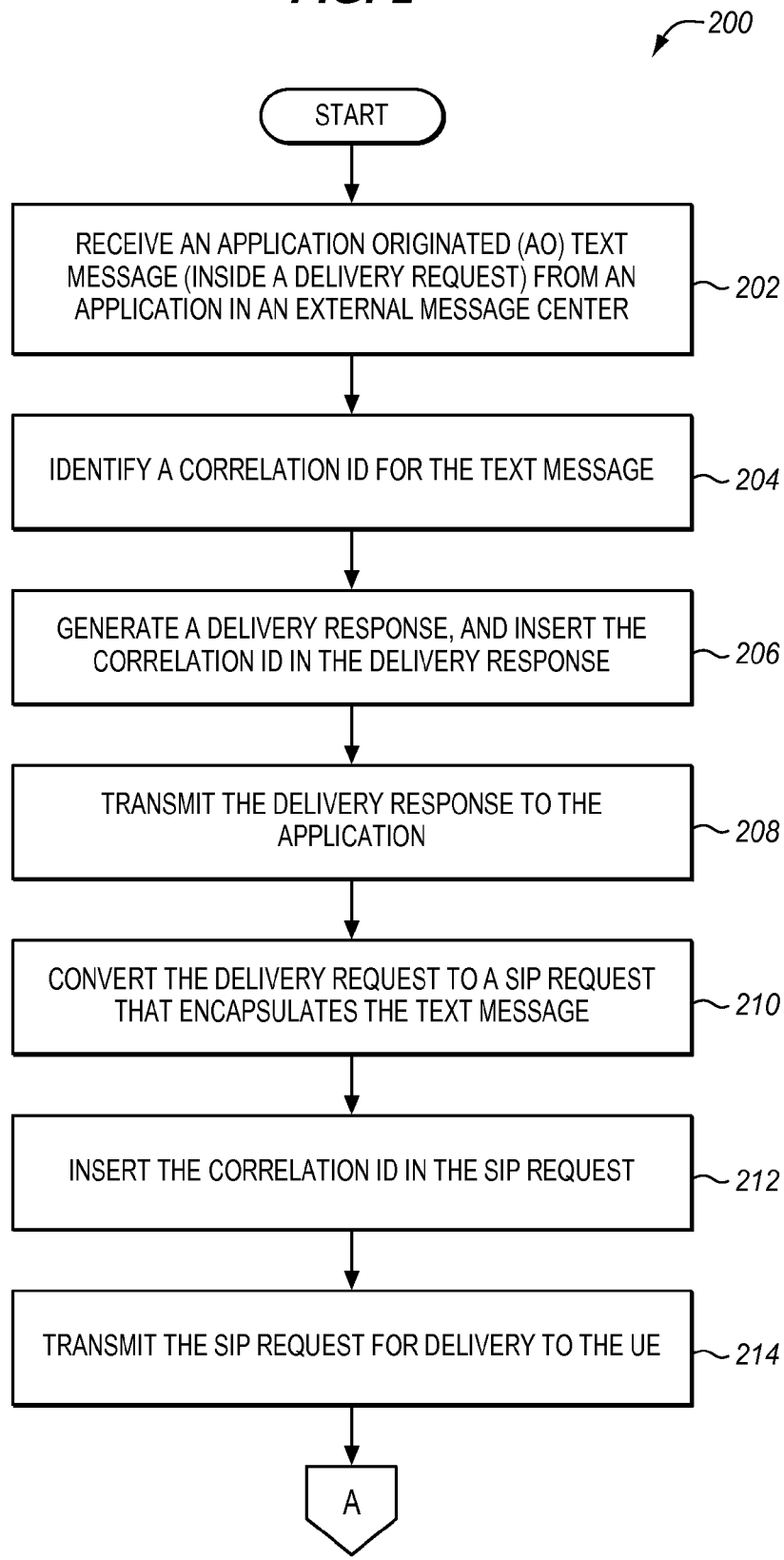
FIG. 2 is a flow chart illustrating a method of handling an AO text message in an exemplary embodiment.

FIG. 2 is a flow chart illustrating a method 200 of handling an AO text message in an exemplary embodiment. The steps of method 200 will be described with reference to text message gateway 130 in FIG. 1, but those skilled in the art will appreciate that method 200 may be performed in other networks and systems. The steps of the flow charts described herein are not all inclusive and may include other steps not shown. The steps may also be performed in an alternative order.

In step 202, network interface 132 receives the AO text message from application 112 of external message center 110. The text message is presumably encapsulated in a delivery request of a protocol other than SIP, such as a Parlay, RESTful, LDAP, XML, or SMPP. One example of a delivery request in SMPP is a submit_sm request. Application 112 may request/require a delivery receipt or delivery acknowledgement for the text message, which will be further described below.

In step 204, control system 134 identifies a correlation identifier (ID) for the text message. The correlation ID comprises any string, integer, or value defined for the text message for correlating messages involved in the delivery of the text message. Control system 134 may generate a new, unique ID in response to receiving the text message. Control system 134 may alternatively re-use a message ID that was received along with the text message from application 112 in the delivery request.

In step 206, control system 134 generates a delivery response in the appropriate protocol, and inserts the correlation ID in the delivery response. For example, if the delivery request is an SMPP submit_sm request, then control system 134 may generate submit_resp response as the delivery response. In step 208, network interface 132 transmits the delivery response to application 112 in external message center 110. Application 112 may then parse the delivery response to identify the correlation ID, and store the correlation ID for later use.

In step 210, control system 134 converts or interworks the delivery request to SIP so that the text message is encapsulated or embedded in a SIP request. The SIP request may comprise a SIP MESSAGE or another type of SIP request that transports text messages (e.g., SMS messages). Control system 134 may embed the text message in the MAP RP-DATA field of the SIP request. In step 212, control system 134 also inserts or embeds the correlation ID in the SIP request. For example, control system 134 may insert the correlation ID in a MAP RP-Message Reference field of the SIP request. Control system 134 may also identify a gateway ID for gateway 130, and insert or embed the gateway ID in the SIP request along with the correlation ID. The gateway ID comprises any string, integer, or value that uniquely references a text message gateway, such as gateway 130. Packet-switched network 120 may have multiple gateways that are used to convert or interwork text messages from application 112 to UE 140 for redundancy and load balancing. The gateway ID will be utilized to correlate the SIP requests when they arrive at different gateways.

In step 214, network interface 132 transmits the SIP request to network element 122 for delivery to UE 140. Upon receiving the SIP request, network element 122 attempts to deliver the SIP request to UE 140.

Figure 3:
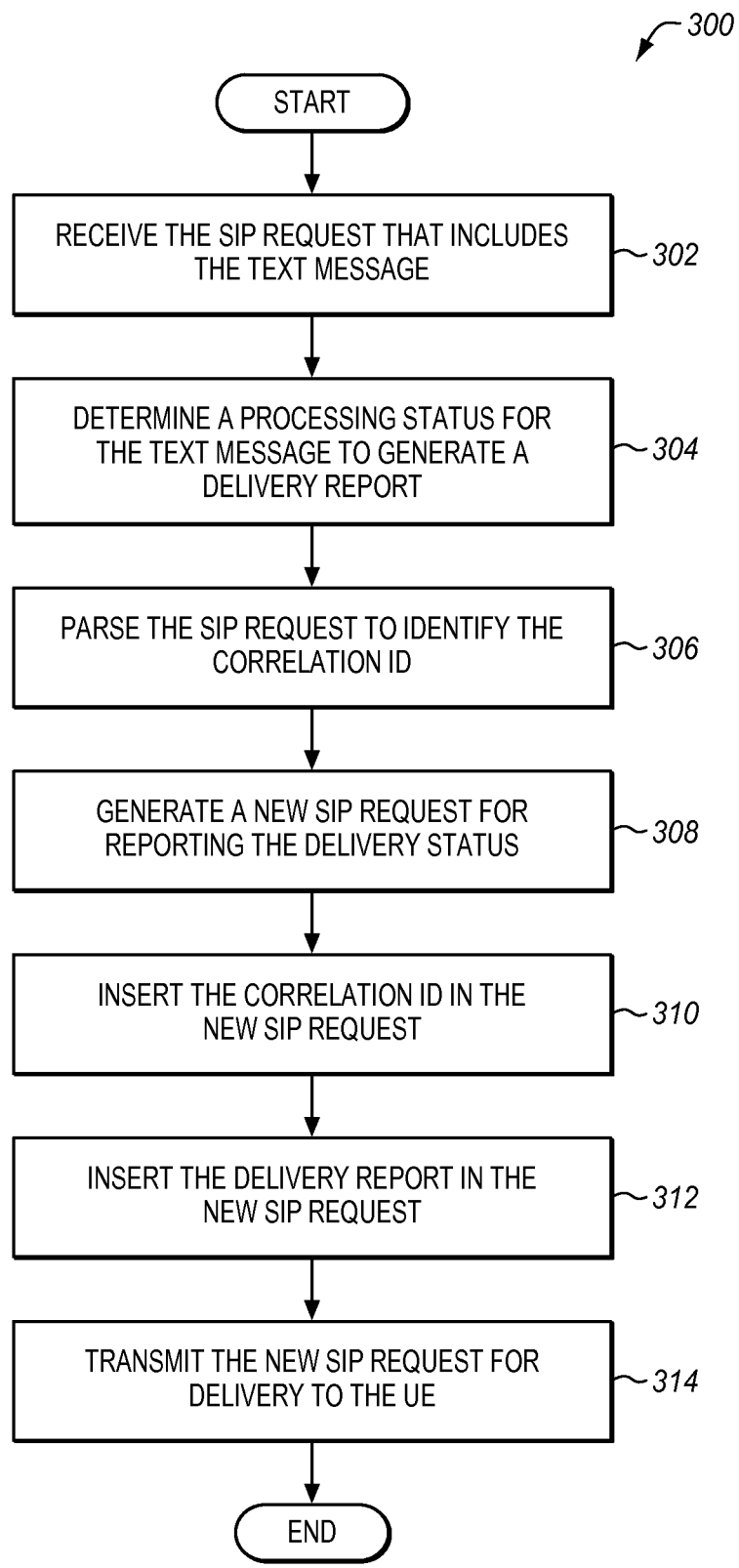
FIG. 3 is a flow chart illustrating a method of handling the AO text message in User Equipment (UE) in an exemplary embodiment.

FIG. 3 is a flow chart illustrating a method 300 of handling the AO text message in UE 140 in an exemplary embodiment. The steps of method 300 will be described with reference to system 100 in FIG. 1, but those skilled in the art will appreciate that method 300 may be performed in other networks, systems, or devices.

In step 302, UE 140 receives the SIP request from network element 122, where the SIP request encapsulates the text message. UE 140 transmits a SIP 200 OK to gateway 130 (through network element 122) acknowledging the successful receipt of the SIP request. In step 304, UE 140 determines a processing status for the encapsulated text message to generate a delivery report of the text message (either in acknowledgement or error report format). The delivery report of the text message is separate from the status of delivering the SIP request which carried the text message (this is done with a 200 OK or SIP 3xx, 4xx, 5xx response). A delivery report comprises any information indicating the success or failure of processing a text message (such as RP-DATA). The process used to determine the delivery report of a text message is beyond the scope of this application. However, in one example, UE 140 may parse the data for the text message to determine if there were addressing errors, formatting errors, or any other types of errors. If one or more errors are detected in parsing the text message, then UE 140 may determine that delivery of the text message has failed. If no errors are detected in parsing the text message, then UE 140 may determine that delivery of the text message was successful.

In step 306, UE 140 parses the original SIP request to identify the correlation ID. UE 140 may parse the MAP RP-Message Reference field to find the correlation ID. UE 140 then generates a new SIP request for reporting the delivery status of the text message, and inserts the correlation ID in the new SIP request (see steps 308 and 310). The new SIP request may again comprise a SIP MESSAGE or another type of SIP request that transports text messages (e.g., SMS messages). To insert the correlation ID in the new SIP request, UE 140 may copy the MAP RP-Message Reference field of the original SIP request into the MAP RP-Message Reference field of the new SIP request. In step 312, UE 140 inserts the delivery report of the text message in the new SIP request. For example, UE 140 may set the MAP-RP-Message Type to RP-ACK or RP-ERROR in the new SIP request. In step 314, UE 140 transmits the new SIP request to gateway 130 through network element 122.

Figure 4:
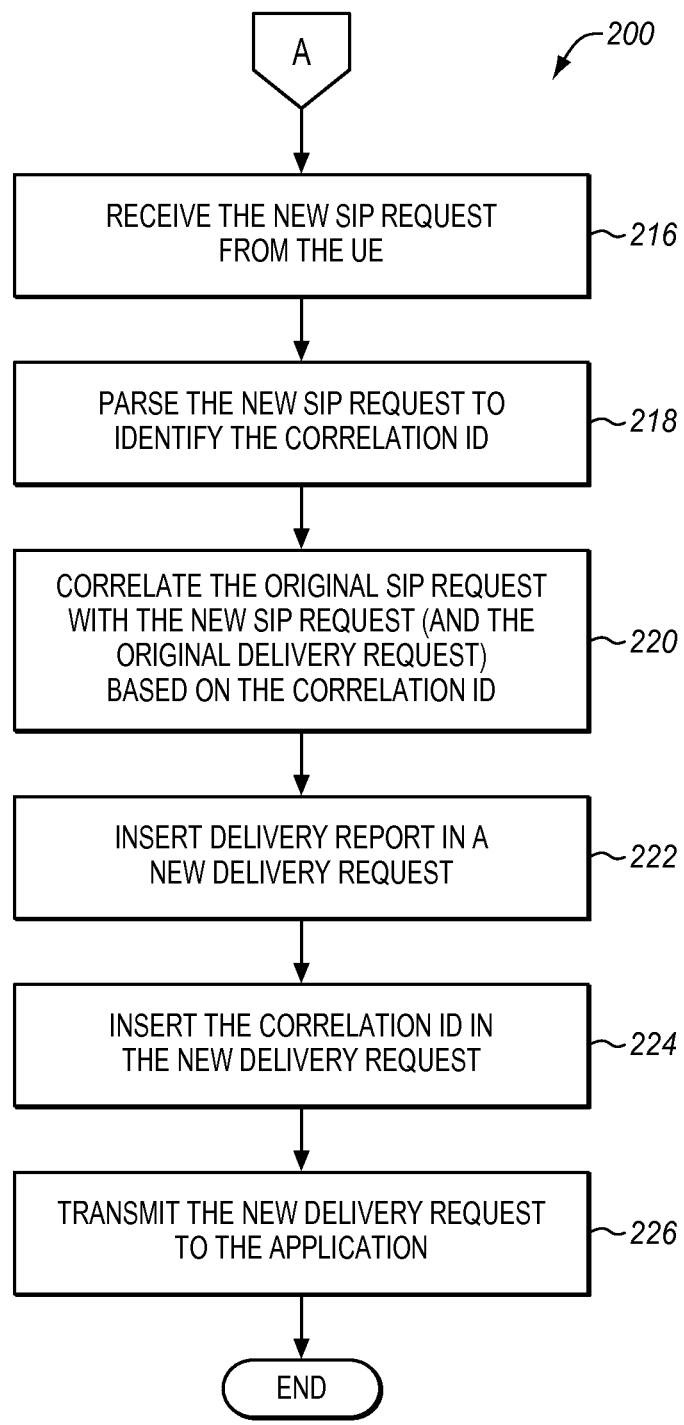
FIG. 4 is a flow chart illustrating additional steps of the method of FIG. 2 for handling the AO text message in an exemplary embodiment.

FIG. 4 is a flow chart illustrating additional steps of method 200 for handling the AO text message in an exemplary embodiment. In step 216, network interface 132 (see FIG. 1) of gateway 130 receives the new SIP request sent by UE 140. In response to receiving the new SIP request, gateway 130 transmits a SIP 200 OK to UE 140 (through network element 122) acknowledging the successful receipt of the new SIP request. In step 218, control system 134 parses the new SIP request to identify the correlation ID. Control system 134 may parse the MAP RP-Message Reference field to find the correlation ID. Control system 134 then correlates the original SIP request (that transported the text message) with the new SIP request (that transported the delivery report for the text message) based on the correlation ID in step 220.

Control system 134 is also able to correlate the two SIP request with the original delivery request from application 112. By correlating the SIP requests with the original delivery request from application 112 based on the correlation ID, control system 134 is able to provide application 112 with the delivery report for the text message. To do so, control system 134 inserts the delivery report for the text message into a new delivery request in step 222. One example of the new delivery request in SMPP is a deliver_sm request. Control system 134 also inserts the correlation ID in the new delivery request in step 224. Network interface 132 then transmits the new delivery request to application 112 in step 226.

Thus, application 112 will be able to correlate the original delivery request for the text message with the new delivery request based on the correlation ID. Application 112 will thus be able to correlate the delivery report from the new delivery request to the AO text message from the original delivery request, and determine whether or not the text message was successfully delivered to its recipient(s). The correlation ID advantageously allows gateway 130 to correlate multiple SIP transactions in reporting the delivery status of the text message. The correlation ID also allows gateway 130 to provide the delivery report back to application 112 because all of the requests used to transport the text message and the delivery report between application 112 and UE 140 are embedded with the common correlation ID. As a result, delivery reports/receipts may be effectively provided for AO MT text messages.

Example

Figure 5:
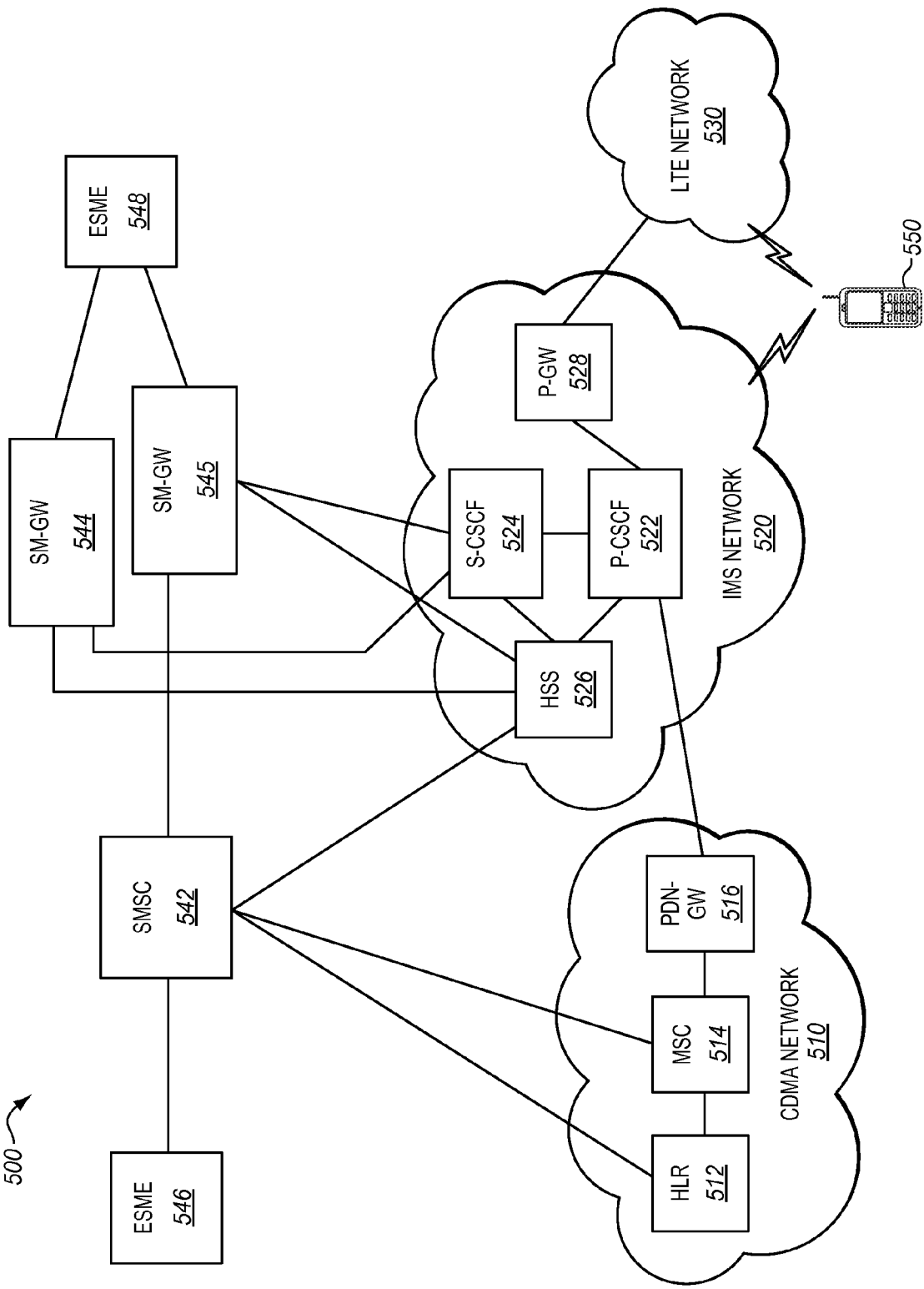
FIG. 5 illustrates a communication system in another exemplary embodiment.

FIG. 5 illustrates a communication system 500 in another exemplary embodiment. Communication system 500 includes multiple wireless communication networks, which are illustrated as a CDMA network 510, an IMS network 520, and an LTE network 530 in this embodiment. The embodiments described below illustrate delivery of SMS messages to a UE (e.g., mobile device) 550 using SIP messages.

CDMA network 510 includes a Home Location Register (HLR) 512, a Mobile Switching Center (MSC) 514, and Packet Data Network Gateway (PDN-GW) 516. HLR 512 is a central subscriber database that stores subscription information and other details (e.g., subscriber profiles) of UEs that are authorized to use CDMA network 510. MSC 514 is the serving node for UEs, and is responsible for handling voice calls, SMS, and other services in CDMA network 510. PDN-GW 516 comprises any node or element in CDMA network 510 that interworks signaling between CDMA network 510 and a packet-switched network, such as IMS network 520. CDMA network 510 may include other network elements that are not shown for the sake of brevity, such as base stations, a radio network controller, etc.

IMS network 520 includes Proxy-Call Session Control Function (P-CSCF) 522, a Serving-Call Session Control Function (S-CSCF) 524, a Home Subscriber Server (HSS) 526, and a packet gateway (P-GW) 528. P-CSCF 522 is the entry point to the IMS domain and serves as the outbound proxy server for IMS devices. S-CSCF 524 is the central node of the signaling plane, and performs session control for IMS devices that initiate sessions over IMS network 520. S-CSCF 524 communicates with IMS devices over one or more access networks that are not shown in FIG. 5. HSS 526 is a subscriber server that stores subscription-related information (e.g., subscriber profiles), performs authentication and authorization of end users, provides information about the subscriber's location, etc. P-GW 528 comprises any node or element in IMS network 520 that exchanges packets with external networks.

The elements of LTE network 530 are not shown in this embodiment for the sake of brevity.

Communication system 500 also includes an SMS Center (SMSC) 542 and one or more Short Message Gateways (SM-GW) 544-545, which may comprise an LTE gateway, an IP Short Message Gateway (IP-SM-GW), or some other gateway that handles SMS over IP. SMSC 542 comprises any node for a circuit-switched network that delivers SMS messages using store-and-forward processing. SM-GWs 544-545 comprises any node that interworks signaling between a SIP-based network and a network or device that uses a different signaling protocol. For example, if a network or device uses Short Message Peer-to-Peer (SMPP) protocol to exchange SMS messages, then SM-GWs 544-545 interwork the SMPP protocol messages to SIP and vice-versa. Communication system 500 also includes External Short Messaging Entities (ESME) 546 and 548. An ESME is an external application that connects to SMSC 542 or SM-GW 544-545 to engage in the sending and/or receiving of SMS messages.

Assume for this embodiment that ESME 548 generates an SMS message that is intended for UE 550. The following embodiment illustrates how a delivery status is provided in a SIP response.

Figure 6:
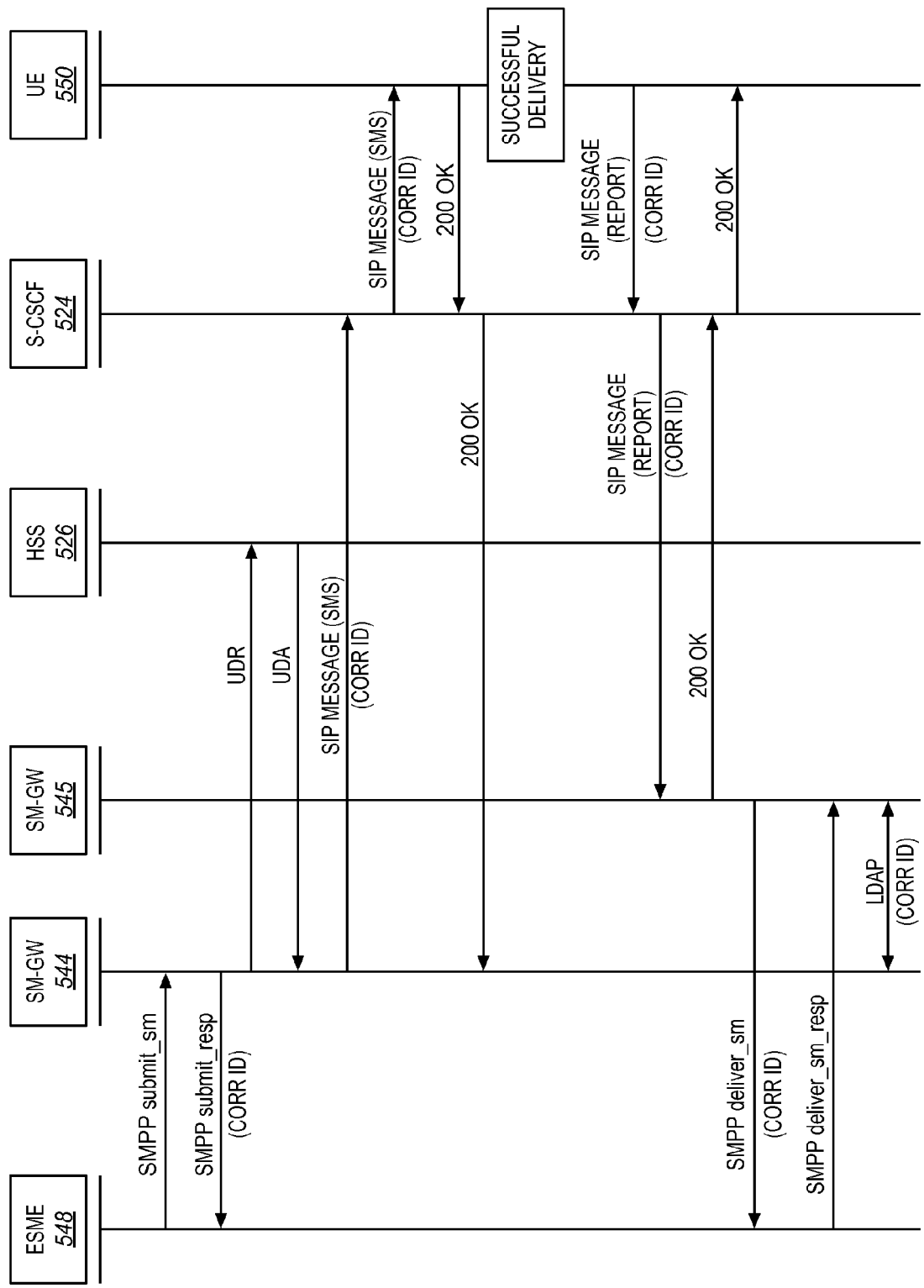
FIG. 6 is a message diagram illustrating a successful delivery of an SMS message in an exemplary embodiment.

FIG. 6 is a message diagram illustrating a successful delivery of an SMS message in an exemplary embodiment. As a reference, text message gateway 130 of FIG. 1 would be implemented in SM-GW 544 and 545 in this embodiment. After ESME 548 generates the SMS message for UE 550, ESME 548 formats an SMPP protocol submit_sm request and encapsulates the SMS message in the submit_sm request. The SMPP protocol submit_sm request represents a delivery request from ESME 548. One assumption at this point is that ESME 548 is enabled for SMPP protocol. If not, an SMPP gateway may be implemented between ESME 548 and SM-GWs 544-545. ESME 548 then sends the submit_sm request to SM-GW 544.

In response to the submit_sm request, SM-GW 544 identifies a correlation ID for the SMS message. SM-GW 544 may generate a new, unique ID in response to receiving the submit_sm request. Alternatively, SM-GW 544 may re-use a message ID that was received in the submit_sm request from ESME 548. SM-GW 544 then generates a submit_resp response, and inserts the correlation ID in the submit_resp response. SM-GW 544 then sends the submit_resp response to ESME 548 with the correlation ID (CORR ID). ESME 548 parses the submit_resp response, and stores the correlation ID for later use.

Next, SM-GW 544 queries HSS 526 for the registration status of UE 550 using a Diameter User Data Request (UDR). HSS 526 determines that UE 550 is registered, and responds to SM-GW 544 with a Diameter User Data Answer (UDA) indicating that UE 550 is registered. SM-GW 544 then constructs a SIP MESSAGE that encapsulates the SMS message. The SMS message is embedded in the RP-DATA (e.g., RP-USER DATA field) of the SIP MESSAGE. SM-GW 544 also embeds the correlation ID and a gateway ID for SM-GW 544 in the SIP MESSAGE. For example, SM-GW 544 may embed the correlation ID and the gateway ID as a combination string in the RP-DATA (e.g., RP-Message Reference field) encapsulated in the SIP MESSAGE. The SIP MESSAGE header may be constructed as follows:

```
MESSAGE tel:+19305020103 SIP/2.0
Via: SIP/2.0/UDP 135.1.62.120:5060;branch=z9hG4b
To: tel:+19305020103
From: tel:+19305020106;tag=1 (ESME Address - long code)
Call-ID: 689e5af4451c0170@livemas1
Max-Forwards: 70
CSeq: 1 MESSAGE
Route: LTE GW SIP URI
P-Charging-Vector=icid-value="PCSF:192.161.1.xxx-xxxxxxxx"
Content-Type: application/vnd.3gpp.sms
Content-Length: xx (Length of Relay Layer Message)
<<Encapsulated RP-DATA (SMS-DELIVER)>>
```

The RP-DATA is in the following format for the SIP MESSAGE:

| Information element | Presence | Usage |
| --- | --- | --- |
| RP-Message Type | Mandatory | Set to 001 for RP-DATA |
| RP-Message Reference | Mandatory | Includes correlation ID and gateway ID |

-continued

| Information element | Presence | Usage |
| --- | --- | --- |
| RP-Originator Address | Mandatory | SMS GW address |
| RP-Destination Address | Mandatory | The length is set to 0 |
| RP-User Data | Mandatory | SMS message |

SM-GW 544 then sends the SIP MESSAGE to S-CSCF 524 in IMS network 520. S-CSCF 524 in turn routes the SIP MESSAGE to UE 550, where UE 550 receives the SIP MESSAGE successfully. Therefore, UE 550 transmits a SIP 200 OK to S-CSCF 524 acknowledging the successful receipt of the SIP MESSAGE. S-CSCF 524 forwards the SIP 200 OK to SM-GW 544.

UE 550 also attempts to parse the SMS message (RP-DATA) in the SIP MESSAGE to determine whether or not the SMS message was successfully delivered. Assume for this embodiment that the SMS was successfully delivered. UE 550 consequently determines that delivery of the SMS message was successful, and informs SM-GW 544 of the successful delivery as follows. UE 550 generates a new SIP MESSAGE for a new SIP transaction, and embeds the correlation ID and the gateway ID in the RP-ACK (RP-Message Reference field) of the SIP MESSAGE. Essentially, UE 550 copies the RP-Message Reference field from the received SIP MESSAGE into the new SIP MESSAGE. UE 550 also inserts a delivery report in the new SIP MESSAGE. UE 550 then transmits the new SIP MESSAGE to S-CSCF 524. The new SIP MESSAGE may look as follows:

```
MESSAGE tel:+19305020103 SIP/2.0
Via: SIP/2.0/UDP
135.1.30.70:5080;branch=z9hG4bK287482662-1402101
Max-Forwards: 70
From: <sip:+19305020106@verizon.net; user=phone;
lr>;tag=pctUA__287482662
To: LTE GW SIP URI
Call-ID: 287482662-1402079
CSeq: 1 MESSAGE
Route: LTE GW SIP URI
P-Asserted-Identity: <sip:+19305020106@somedomain.com>
P-Asserted-Identity: <tel:+19305020106>
Content-Type: application/vnd.3gpp.sms
Content-Length: xx (Length of Relay Layer Message)
<<Encapsulated RP-ACK (SMS-DELIVER-REPORT Message)>>
```

The RP-DATA is in the following format for the new SIP MESSAGE:

| Information element | Presence | Usage |
| --- | --- | --- |
| RP-Message Type | Mandatory | Set to 010 for RP-ACK |
| RP-Message Reference | Mandatory | Received from RP-DATA |
| RP-User Data | Optional | May include SMS-DELIVER-REPORT for ACK |

S-CSCF 524 resolves VIP address from the new SIP MESSAGE, and routes SIP MESSAGE to SM-GW 545 where SM-GW 545 receives the new SIP MESSAGE successfully. Therefore, SM-GW 545 transmits a SIP 200 OK to S-CSCF 524 acknowledging the successful receipt of the new SIP MESSAGE. S-CSCF 524 forwards the SIP 200 OK to UE 550.

After receiving the new SIP MESSAGE, SM-GW 545 parses the RP-ACK from the SIP MESSAGE and the RP-Message Reference field to identify the correlation ID. SM-GW 545 discovers previous RP-DATA message was sent by SM-GW 544 based on the gateway ID for SM-GW 544. Thus, SM-GW 545 correlates the new SIP request to the original SIP request and the original SMPP request from ESME 548. Because all payload data is complete for the SMS message, SM-GW 545 transmits a SMPP deliver_sm request to ESME 548 with the correlation ID and delivery report. SM-GW 545 sets the receipted_message_id in the SMPP deliver_sm request to the correlation ID. SM-GW 545 also notifies SM-GW 544 of the transactions. SM-GW 544 saves transaction data in a database.

ESME 548 receives the deliver_sm request from SM-GW 545. This request is a separate SMPP transaction much like the two SIP MESSAGES were different SIP transactions. However, ESME 548 is able to correlate the deliver_sm request to the submit_sm request based on the correlation ID. SM-GW 545 may thus identify the delivery report for the SMS message based on the status information inserted in the deliver_sm request. Thus, ESME 548 is advantageously able to correlate the delivery status information with the SMS message that was sent. Even though SM-GW 544 translated the SMS message from SMPP to SIP, ESME 548 was able to receive delivery status information for the SMS message.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:
1. A system comprising:
a text message gateway configured to interwork communications between a text message application and a packet-switched network that uses Session Initiation Protocol (SIP);

the text message gateway further configured to receive a first delivery request from the text message application that includes an Application Originated (AO) text message intended for User Equipment (UE) being served by the packet-switched network, to generate a correlation identifier (ID) that uniquely references the AO text message, to insert the correlation ID that uniquely references the AO text message in a delivery response, and to transmit the delivery response to the text message application;

the text message gateway further configured to convert the first delivery request into a first SIP request that encapsulates the AO text message, to insert the correlation ID that uniquely references the AO text message in the first SIP request, and to transmit the first SIP request to the UE;

the text message gateway is further configured to receive a second SIP request from the UE that includes a delivery report indicating a status for delivering the AO text message to the UE, to parse the second SIP request to identify the correlation ID, and to correlate the second SIP request with at least one of the first SIP request and the first delivery request based on the correlation ID.

2. The system of claim 1 wherein:
the text message gateway is further configured to insert the delivery report in a second delivery request, to insert the correlation ID in the second delivery request, and to transmit the second delivery request to the text message application so that the text message application is able to correlate the delivery report with the first delivery request originally used to send the AO text message.

3. The system of claim 2 wherein:
a signaling protocol used by the text message application comprises Short Message Peer-to-Peer (SMPP) protocol;
the first delivery request comprises an SMPP submit_sm message; and
the second delivery request comprises an SMPP deliver_sm message.

4. The system of claim 3 wherein:
the text message gateway is further configured to insert the correlation ID in a receipted_message_id field of the SMPP deliver_sm message.

5. The system of claim 1 wherein:
the text message gateway is further configured to insert the correlation ID in the first SIP request in a Mobile Application Part (MAP) RP-Message Reference field.

6. The system of claim 5 wherein:
the text message gateway is further configured to insert a gateway ID for the text message gateway along with the correlation ID in the MAP RP-Message Reference field.

7. The system of claim 1 wherein:
the packet-switched network comprises an IP Multimedia Subsystem (IMS) network or a Long Term Evolution (LTE) network.

8. The system of claim 1 wherein:
the text message gateway is implemented in a Long Term Evolution Gateway (LTE GW) of an LTE network or an IP Short Message Gateway (IP-SM-GW) of an IP Multimedia Subsystem (IMS) network.

9. A method comprising:
receiving a first delivery request from a text message application that includes an Application Originated (AO) text message intended for User Equipment (UE) being served by a packet-switched network;
generating a correlation identifier (ID) that uniquely references the AO text message;
inserting the correlation ID that uniquely references the AO text message in a delivery response;
transmitting the delivery response to the text message application;
converting the first delivery request into a first Session Initiation Protocol (SIP) request that encapsulates the AO text message;
inserting the correlation ID that uniquely references the AO text message in the first SIP request;
transmitting the first SIP request to the UE;
receiving a second SIP request from the UE that includes a delivery report indicating a status for delivering the AO text message to the UE;
parsing the second SIP request to identify the correlation ID; and
correlating the second SIP request with the first SIP request and the first delivery request based on the correlation ID.

10. The method of claim 9 further comprising:
inserting the delivery report in a second delivery request;
inserting the correlation ID in the second delivery request; and
transmitting the second delivery request to the text message application so that the text message application is able to correlate the delivery report with the first delivery request originally used to send the AO text message.

11. The method of claim 10 wherein:
a signaling protocol used by the text message application comprises Short Message Peer-to-Peer (SMPP) protocol;
the first delivery request comprises an SMPP submit_sm message; and
the second delivery request comprises an SMPP deliver_sm message.

12. The method of claim 11 wherein inserting the correlation ID in the second delivery request comprises:
inserting the correlation ID in a receipted_message_id field of the SMPP deliver_sm message.

13. The method of claim 9 wherein inserting the correlation ID in a first SIP request comprises:
inserting the correlation ID in the first SIP request in a Mobile Application Part (MAP) RP-Message Reference field.

14. The method of claim 13 further comprising:
inserting a gateway ID for a text message gateway along with the correlation ID in the MAP RP-Message Reference field.

15. The method of claim 9 wherein:
the packet-switched network comprises an IP Multimedia Subsystem (IMS) network or a Long Term Evolution (LTE) network.

16. A system comprising:
a Short Message Gateway (SM-GW) that interworks communications between an application in an external message center and a packet-switched network that uses Session Initiation Protocol (SIP);
the SM-GW configured to receive a first delivery request from the application that includes an Application Originated (AO) Short Message Service (SMS) message intended for User Equipment (UE) being served by the packet-switched network, generate a correlation identifier (ID) that uniquely references the AO text message, insert the correlation ID that uniquely references the AO text message in a delivery response, and transmit the delivery response to the application;
the SM-GW configured to convert the delivery request into a first SIP request that encapsulates the AO text message, insert the correlation ID that uniquely references the AO text message in a Mobile Application Part (MAP) RP-Message Reference field of the first SIP request, and transmit the first SIP request to the UE;

the SM-GW is configured to receive a second SIP request from the UE that includes a delivery report indicating a status for the delivery of the AO text message to the UE, parse a MAP RP-Message Reference field of the second SIP request to identify the correlation ID, and correlate the second SIP request with the first SIP request and the first delivery request based on the correlation ID.

17. The system of claim 16 wherein:

the SM-GW is configured to insert the delivery report in a second delivery request, insert the correlation ID in the second delivery request, and transmit the second delivery request to the application so that the application is able to correlate the delivery report with the first delivery request originally used to send the AO text message.

* * * * *